ately 1 of 10 trials
United States Patent
Beyerlein

[19]

[11] 3,716,273
[45] Feb. 13, 1973

[54] VARIABLE SENSITIVITY ANTI-LOCK BRAKE CONTROL
[75] Inventor: David G. Beyerlein, Flint, Mich.
[73] Assignee: General Motors Corporation, Detroit, Mich.
[22] Filed: June 1, 1970
[21] Appl. No.: 42,304

[52] U.S. Cl. .........................303/21 CG, 188/181 A
[51] Int. Cl. ................................................B60t 8/12
[58] Field of Search ...188/181; 303/20, 21; 324/162; 340/262

[56] References Cited
UNITED STATES PATENTS

| 3,635,531 | 1/1972 | Okamoto et al. | 303/21 CG |
| 3,545,817 | 12/1970 | Yarber | 303/21 P |
| 3,524,685 | 8/1970 | Harned et al. | 303/20 X |
| 3,554,612 | 1/1971 | Harned | 303/21 BE |
| 3,556,614 | 1/1971 | Steigerwald | 303/21 CG |

Primary Examiner—Trygve M. Blix
Assistant Examiner—Stephen G. Kunin
Attorney—Jean L. Carpenter, Paul Fitzpatrick and Warren D. Hill

[57] ABSTRACT

The control includes a reference signal with which braked wheel deceleration is compared for sensing incipient wheel lock-up and a circuit responsive to the rate of change of deceleration for changing the reference signal to make the control more or less sensitive to deceleration. The circuit is so arranged that the sensitivity is increased at a low rate of change of deceleration such as occurs during a gradual application of brake pressure on a low coefficient of friction surface.

4 Claims, 3 Drawing Figures

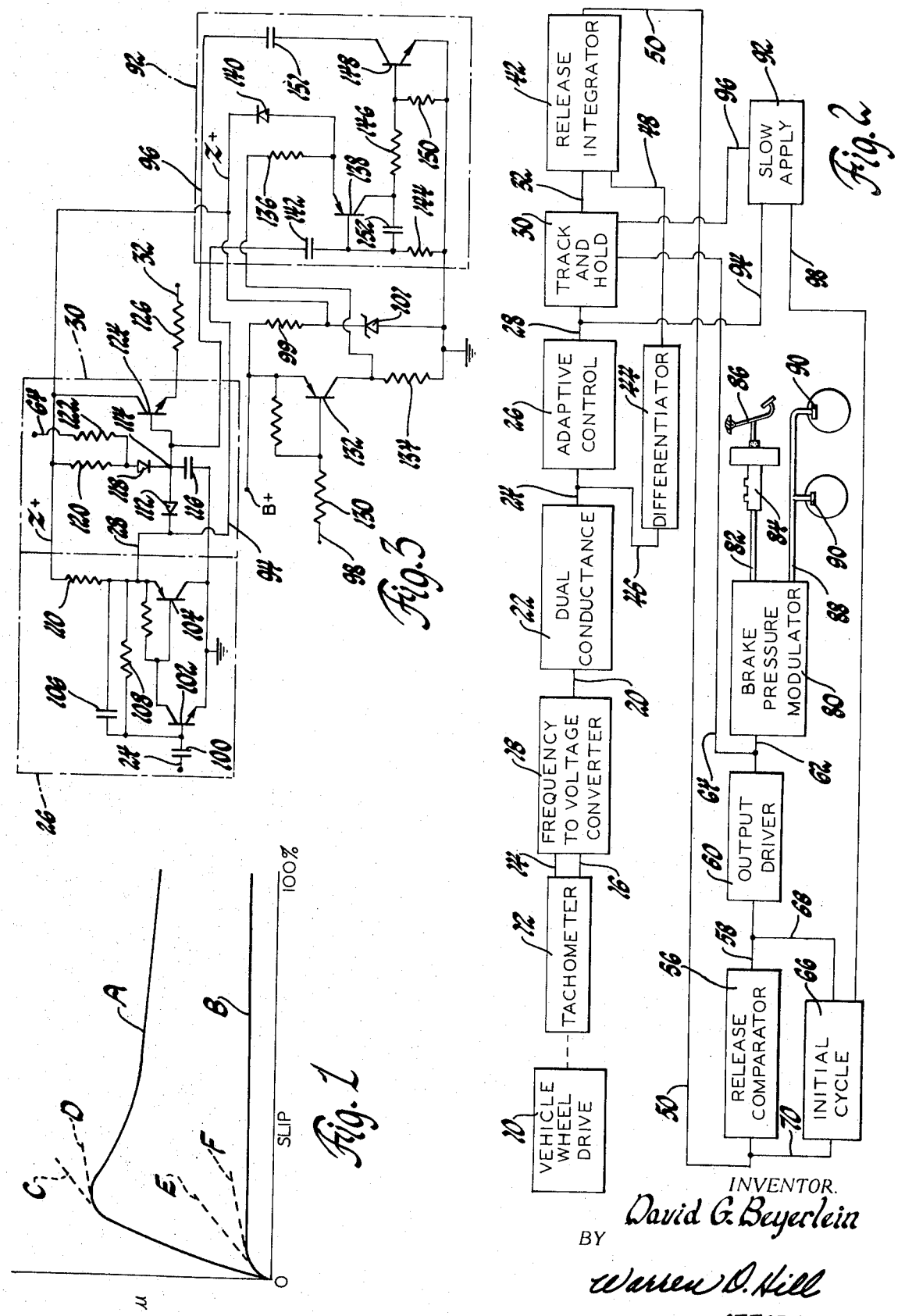

VARIABLE SENSITIVITY ANTI-LOCK BRAKE CONTROL

This invention relates to an anti-lock brake control and more particularly, to such a control which is particularly sensitive to gradual brake application on low coefficient of friction surfaces.

Anti-lock brake controls frequently are based in their operation on the comparison of braked wheel deceleration to some predetermined or determinable reference value so that when the wheel deceleration achieves a prescribed relationship to the reference signal, the brake pressure is reduced or released to allow recovery of the braked wheel and to avoid locking of that wheel. Usually the reference signal is fixed or varies according to the coefficient of friction of the road surface to accommodate varying road conditions. It has been found desirable, however, to further modify such controls to take into account the rate of brake application since in some circumstances, particularly on low coefficient surfaces and gradual brake application, response of the control system can thereby be improved.

It is therefore an object of this invention to provide an anti-lock brake control having a varying sensitivity to accommodate gradual brake application on low coefficient of friction road surfaces.

It is another object of the invention to provide an anti-lock brake control system having an increased sensitivity when the rate of change of deceleration of a braked wheel is small.

It is a further object of this invention to provide an anti-lock brake control system having a deceleration reference signal which is variable in response to the rate of change of deceleration of a braked wheel.

The invention is carried out by providing an anti-lock brake control having a varying sensitivity level and a device responsive to the rate of change of wheel deceleration for effecting high sensitivity at low rates and lower sensitivity for high rates of change of wheel deceleration.

The invention is further carried out by providing in an anti-lock brake control system a control circuit for comparing a wheel deceleration signal to a reference signal to effect brake release upon a predetermined relationship of those signals and a circuit responsive to the rate of change of deceleration of a braked wheel for altering the reference signal to change the sensitivity of the control so that the control is more sensitive to wheel deceleration on low coefficient surfaces with relatively gradual brake application than on high coefficient of friction surfaces or with abrupt brake application.

The above and other advantages will be made more apparent from the following specification taken in conjunction with the accompanying drawings wherein like reference numerals refer to like parts and wherein:

FIG. 1 is a graph depicting mu-slip curves for tires on high and low coefficient surfaces;

FIG. 2 is a diagrammatic representation of an anti-lock brake control system according to the invention; and, FIG. 3 is a schematic representation of a portion of FIG. 1, particularly illustrating the invention.

While the subject invention is of general application to various anti-lock control systems, it is described herein with reference to the system described in the patent application of Van Ostrom et al., Ser. No. 806,807, filed Mar. 13, 1969, now abandoned and the corresponding continuation Ser. No. 128,484 filed Mar. 26, 1971. Reference may be had to that application for details not specifically described herein.

FIG. 1 illustrates the well known mu-slip curves which show braking force between a tire and a road surface as a function of wheel slip. The full line curves A and B depict the mu-slip curves for a high coefficient of friction surface and a low coefficient surface respectively. The salient feature of the high coefficient surface curve A is the peak occurring at about 20 percent slip followed by a negative slope portion at higher amounts of slip. In contrast, on very slippery roads as shown in the curve B, there is no significant peak if any to the curve and after reaching a maximum the curve is essentially flat. Superimposed on the curve of FIG. 1 are dotted lines C, D, E and F which represent the braking force applied to the wheel for various rates of application of braking pressure supplied by the vehicle operator in the absence of any intervention by the anti-lock brake control system. Line C and E represent fairly abrupt or rapid application of brake pressure for dry surfaces and slippery surfaces, respectively. It is apparent from the graph that the line W rapidly diverges from curve A and line E rapidly diverges from the curve B due to the steep slope of the lines C and E. Line D represents a gradual or slow brake application on a high coefficient surface and that line also rapidly diverges from curve A because of the significant negative slope of curve A following the peak. In each of these three cases, the vertical distance at any given point represents the net decelerating force on the wheel and since these forces are substantial, the deceleration will be large and will readily be sensed by an anti-lock control circuit. The rapid divergence of these lines from their respective curves A and B also indicates that the rate of change of deceleration (the second derivative of velocity with respect to time) is also large. The dotted line F represents the gradual or slow application of brake pressure on a low coefficient surface and it is apparent from the graph that the vertical distance of the line F from the curve B is relatively small indicating a small decelerating force on the wheel which can be very difficult for the anti-lock control to sense. Further, since the line F diverges from the flat portion of curve B at a low rate, the rate of change of wheel deceleration will be low. Thus the slow brake application condition occurring on a low coefficient surface differs from all the other conditions mentioned in that a small deceleration and a low rate of change of deceleration result. It is the purpose of this invention to take advantage of that difference in the rate of change in deceleration as a control parameter for altering the sensitivity of the control so that it will respond to all incipient wheel lock-up conditions even those involving low braked wheel deceleration while retaining a desirable less sensitive response for the usual incipient lock-up conditions involving high deceleration.

The system for which this invention is utilized follows the well esTablished principle of sensing incipient wheel lock-up when brake pressure is applied to vehicle brakes, then relieving the brake pressure until the wheel accelerates enough to be out of danger of locking and then reapplying the brake pressure. This cycle is repeated as necessary to achieve the desired braking action.

Referring to FIG. 2 for a further description of the brake regulating system, a vehicle wheel drive 10 is provided as an information source for the system. The vehicle wheel drive 10 may be a wheel per se, a propeller shaft driving a plurality of wheels or any other vehicle member having a velocity or rotation proportional to wheel velocity. A tachometer 12 such as a well known toothed wheel variable reluctance electromagnetic transducer is driven by the wheel drive 10 and provides an alternating signal having a frequency proportional to the wheel speed on lines 14 and 16 leading to a frequency-to-voltage converter 18. The frequency-to-voltage converter 18 produces on line 20 a linear voltage proportional to frequency and hence proportional to wheel speed, but containing some AC ripple. The line 20 is connected to a dual conductance circuit 22 which provides some filtering of the AC ripple in the wheel speed signal but does not detract from the sensitivity of the following circuit to wheel deceleration. The dual conductance circuit 22 is connected by line 24 to an adaptive control circuit 26 which is responsive to the speed signal and produces an output on line 28 which roughly simulates vehicle deceleration by sensing wheel deceleration when the wheel speed is in substantial synchronism with the vehicle speed. The line 28 is connected to a track and hold circuit 30 which modifies the simulated vehicle deceleration signal on line 28 to provide a reference signal on line 32. The track and hold circuit 30 is connected by line 32 to a release integrator 42. A differentiator 44 is connected by line 46 to line 24 and by line 48 to the release integrator 42. The differentiator 44 senses a wheel speed signal on line 24 and differentiates that signal to produce an output on line 48 proportional to the wheel deceleration.

The release integrator 42 compares the wheel deceleration signal with the reference signal which corresponds to the Simulated vehicle deceleration signal and integrated the difference to produce on line 50 an output proportional to the difference between the simulated vehicle speed and the wheel speed. This velocity error signal is normally fed unaltered by line 50 to a release comparator 56 which produces an output signal on line 58 whenever the velocity error signal exceeds a predetermined maximum. The release comparator includes a hysteresis circuit which terminates the signal on line 58 when the velocity error signal drops below a predetermined minimum value. The line 58 is connected to an output driver 60 which amplifies the signal on line 58 to produce an output on line 62. The line 64 connects the output signal on line 62 back to the track and hold circuit 30 to form an input thereto.

An initial cycle circuit 66 has an input from the release comparator 56 by way of line 68 and has an output connected by line 70 to the input of the release comparator 56. The function of the initial cycle circuit 66 is to provide a bias signal to the input of the release comparator 56 to render the release comparator less sensitive to the velocity error signal during the first cycle of anti-lock brake operation to insure that the wheel is approaching an incipient lock-up condition before effecting brake release. When the release comparator 56 produces a first release signal on line 58, it also provides a signal on line 68 which terminates the output of the initial cycle circuit 66 and succeeding release signals on lines 68 and 70 will maintain the initial cycle circuit 66 off during subsequent cycles of anti-lock brake operation. The output signal on line 62 on the output driver 60 is fed to a brake pressure modulator 80 which is connected by a brake line 82 to a brake master cylinder 84 operated by a foot pedal 86. An output brake line 88 from the brake pressure modulator 80 is connected to the vehicle brakes 90. Normally the brake pressure from the master cylinder 84 is conducted by lines 82 and 88 through the brake pressure modulator 80 to the brakes 90 without interference. However, when an output signal is provided on line 62 indicating that an incipient skid condition has been sensed by the control circuit, the brake pressure modulator then reduces the brake pressure in the brake line 88 to release or relieve the braking effort.

To carry out the present invention, a slow apply circuit 92 is added to the control. This circuit is connected to the output of the adaptive control 26 by a line 94, to the track and hold circuit 30 by line 96 and to the initial cycle circuit 66 by a line 98. The slow apply circuit 92 is energized by the initial cycle circuit 66 only during the first cycle of anti-lock brake operation and then only until the first brake release since it is only during the first cycle that a slow rate of brake application can occur, the succeeding cycles of braking application being controlled by the brake pressure modulator which causes brake reapplication at rapid rates of pressure increase. When energized, the slow apply circuit 92 renders the control circuit more sensitive by attenuating the output of the track and hold circuit thereby tending to lessen the value of the reference signal provided to the release integrator 42. By sampling the output of the adaptive control 26, the slow apply circuit 92 senses the rate of change of wheel deceleration and when that rate becomes large, ceases to attenuate the output of the track and hold circuit 30. The net effect of the slow apply circuit 92 is that the anti-lock control circuit becomes more sensitive to low wheel decelerations only when the rate of change of deceleration is low prior to the first brake release.

The operation of the slow apply circuit 92 is more fully described with reference to FIG. 3. The circuitry of FIG. 3 is powered by a line B+ connected to a 12-volt vehicle battery, not shown. A resistor 99 and a Zener diode 101 are serially connected to ground and their junction is connected to a line Z+ so that a regulated supply voltage of 8.2 volts is applied to line Z+.

The purpose of the adaptive control 26 is to provide an output voltage which is a useful measure of vehicle deceleration. When the vehicle brakes are first applied, the wheel deceleration is generally proportional to the vehicle acceleration until excessive wheel slip occurs. The adaptive control senses the wheel deceleration and after a short time delay, provides an output signal on line 28 representing that wheel deceleration and further representing a reasonable measure of vehicle deceleration even though after the time delay the wheel deceleration may differ greatly from the vehicle deceleration. The adaptive control 26 has an input on line 24 representing wheel velocity, which input is fed to a differentiating capacitor 100. An operational amplifier comprising transistors 102 and 104 with a feedback circuit comprising a capacitor 106 in parallel with a resistor 108 completes the adaptive control circuit. The capacitor 100 is connected to the base of the transistor 102, the collector of which is connected to the base of the transistor 104 and the emitter of which is grounded. The collector of the transistor 104 is grounded and its emitter, which forms the output of the adaptive control circuit, is connected through a load resistor 110 to the regulated voltage supply Z+. The output of the adaptive control on line 28 then be nearly proportional to the wheel deceleration and vehicle deceleration except that the output lags behind the input due to the time delay imposed by the RC constant of the capacitor 106 and the resistor 108 and the output is limited to a range of deceleration from zero to a predetermined maximum, preferably about 1.1g. The value of the capacitor 106 is selected to be small enough to allow dynamic tracking of vehicle deceleration when the wheel is decelerating nearly in synchronism with the vehicle and yet large enough to remember vehicle deceleration when wheel deceleration increases rapidly. The adaptive control output on line 28 will provide a reasonably good measure of wheel deceleration as long as the wheel and the vehicle are decelerating nearly synchronously and tends to maintain that same output for a short period after the wheel beings to decelerate rapidly.

The track and hold circuit 30 is provided to limit excursions of the adaptive control output after a brake release signal is applied to lines 62 and 64 and to provide at all times as an output a reference signal related to the adaptive control output and representing a simulation of vehicle deceleration. The track and hold circuit 30 includes a diode 112 connected between line 28 and a junction point 114. The junction point is connected by a capacitor 116 to ground and is further connected through a diode 118 and a resistor 120 to the line Z+. The diode 118 is also connected to line 64 through a resistor 122. A transistor 124 has its base connected to the junction point 114, its collector connected to line Z+ and its emitter connected through a resistor 126 to the line 32. In operation, during brake application, the line 64 is at battery or B+ potential so that current flows through the diode 118 and 112 to line 28. Then the voltage at the junction point 114 and on the capacitor 116 is equal to the voltage on line 28 plus the small voltage drop across the diode 112 except for a small time lag required to charge the capacitor 116 to that voltage. Thus, so long as the brakes are applied, the voltage of the junction 114 will merely track the voltage of line 28. The emitter of the transistor 124 will essentially follow the voltage of the base, the transistor serving only to isolate capacitor 116 from the output of line 34 so that the capacitor 116 can hold its charge. When the output on line 64 approaches ground potential to call for brake release, the junction of the resistors 120 and 122 will assume a potential less than Z+ by virtue of the voltage dividing action of those resistors. Preferably these resistors are selected to provide a voltage of about 4 volts at their junction which corresponds to a deceleration of 0.5g's. This arrangement then allows the voltage at junction point 114 to track down according to the voltage at line 28 but will not allow the voltage to track up beyond four volts due to the backbiasing of the diode 118. If, however, at the time of brake release the voltage at the junction point 114 is higher than four volts, then that voltage will be held after brake release by the capacitor 116 if the voltage on line 28 does not decrease. Thus the output voltage at the emitter of transistor 124 will be essentially the same as the voltage on the line 28 except for the limitations imposed by the track and hold circuit 30 after brake release and except for the small time lag required in charging the capacitor 116.

The initial cycle circuit 66 provides a ground potential on line 98 until the release comparator 56 produces a brake release signal whereupon the potential of line 98 approaches B+ potential and the B+ potential is maintained throughout the succession of brake release and apply cycles so long as the anti-lock brake operation persists. The line 98 is connected through resistor 130 to the base of a transistor 132, which has its emitter connected to B+ and its collector connected through a load resistor 134 to ground so that the collector will be at ground potential when line 98 is at B+ potential and when line 98 is at ground potential, the collector will be nearly at B+ potential. The collector of transistor 132 is connected to the resistor 136 in the slow apply circuit 92. The resistor 136 in turn is connected to the emitter of the transistor 138 and also is connected through a diode 140 to Z+. Thus during the initial cycle B+ potential is applied to the resistor 136 which provides to the emitter of the transistor 138 a voltage equal to Z+ potential plus the voltage drop across the diode 140. The base of the transistor 138 is connected through a differentiating capacitor 142 to the output line 28 of the adaptive control. It is also connected through a resistor 144 to ground. The collector of the transistor 138 is connected through a voltage dropping resistor 146 to the base of a transistor which in turn is connected to ground through a base bias resistor 150. The collector of the transistor 148 is connected through a capacitor 151 to the junction point 114 in the track and hold circuit 30. A filter capacitor 152 is connected between the base and collector of transistor 138.

In operation of the slow apply circuit 92, when the transistor 138 is conducting, a voltage approximately equal to Z+ and having a degree of temperature compensation is generated across resistor 144. The voltage drop across resistor 144 produces a current through the resistor that can be considered a constant reference current. Further, when the transistor 138 is conducting, the transistor 148 is biased to saturation so that in effect, the capacitor 150 is placed in parallel with the capacitor 116 of the track and hold circuit. The adaptive control 26 produces on line 28 a voltage representative of the deceleration of the vehicle wheel. The input capacitor 142 performs a differentiating function and produces a current roughly proportional to the rate of change of wheel deceleration and this current passes through resistor 144. When the current through the capacitor 142 exceeds the reference current through the resistor 144, the transistor 138 is turned off essentially stopping current flow to the base of the transistor 148 and turning off that transistor to effectively isolate the capacitor 150 from ground to render it ineffective. The varying impedance of the transistor 148 then varies the capacitance between the junction point 114 and ground. Thus when the effective capacitance is increased, the voltage at the junction 114 follows the voltage of line 28 less closely and during deceleration assumes a lower value then if the capacitor 151 were not in the circuit. This lower voltage consequently decreases the reference signal on line 32 which renders the release integrator 42 more sensitive to wheel deceleration. This is so because the release integrator 42 subtracts the reference signal on line 32 from the wheel deceleration signal on line 48 and as the reference signal becomes smaller, the response of the release integrator to the wheel deceleration signal becomes greater. However, when the rate of change of wheel deceleration as sensed by the capacitor 142 exceeds a predetermined value, the capacitor 151 is effectively removed from the circuit so that the voltage at the junction point 114 is allowed to more closely track the voltage on line 28 so that the sensitivity of the release integrator 42 is reduced. After the brake release during anti-lock operation, the resistor 136 is grounded due to the operation of the initial cycle circuit 66 and the slow apply circuit 92 is disabled allowing the release integrator 42 to maintain its lower sensitivity level.

It will thus be seen that the invention as described provides a way to render an anti-lock brake control circuit very sensitive to wheel deceleration during the condition of slow or gradual brake application on a low coefficient of friction surface and render the control less sensitive under other conditions where the high sensitivity is not desirable.

The embodiment of the invention described herein is for the purpose of illustration and the scope of the invention is intended to be limited only by the following claims:

I claim:

1. In an anti-lock brake control system for a wheeled vehicle having wheel braking means, a brake regulator means including means for sensing rotation of a braked wheel, and a control responsive to wheel rotation for effecting brake release to prevent wheel lock-up, the control having a varying sensitivity level to accommodate road surfaces of different coefficients of friction and different rates of brake application, and means for selecting the appropriate sensitivity level comprising:

rate means responsive to rotation of a braked wheel for measuring the rate of change of wheel deceleration and means responsive to the rate of change of wheel deceleration for changing the sensitivity level of the control, whereby on low coefficient surfaces and with relatively gradual brake application the control is more sensitive to wheel deceleration than on high coefficient surfaces or with abrupt brake application.

2. In an anti-lock system for a wheeled vehicle having braking means, a brake regulator means including means for sensing rotation of a braked wheel and a control circuit responsive to wheel rotation for cyclically effecting brake release and brake application to prevent wheel lock-up and maintain optimum braking effort, the control circuit having a varying sensitivity level on the first brake release cycle only to accommodate road surfaces of high or low coefficients of friction and rapid or slow rates of brake application, and means for selecting the appropriate sensitivity level comprising, rate means responsive to rotation of a braked wheel for measuring the rate of change of wheel deceleration, means responsive to the rate of change of wheel deceleration for changing the sensitivity level of the control circuit to effect a high sensitivity at a low rate of change of wheel deceleration and a low sensitivity at a high rate of change of wheel deceleration, and means effective upon the first brake release for disabling the sensitivity selecting means whereby on low coefficient surfaces and with relatively gradual brake application the control is more sensitive to wheel deceleration than on high coefficient surfaces or with abrupt brake application.

3. In an anti-lock brake control system for a wheeled vehicle having wheel braking means, a brake regulator means including means for sensing rotation of a braked wheel and a control circuit responsive to wheel rotation for cyclically effecting brake release and brake application to prevent wheel lock-up, the control circuit having means for producing a signal as a function of wheel deceleration, means for producing a reference signal, comparator means for comparing the deceleration signal to the reference signal so that the sensitivity of the comparator means to wheel deceleration is affected by the value of the reference signal, rate means responsive to rotation of a braked wheel for measuring the rate of change of wheel deceleration, and means responsive to the rate of change of deceleration for attenuating the reference signal thereby changing the sensitivity of the control, whereby on low coefficient surfaces and with relatively gradual brake application the control is more sensitive to wheel deceleration than on high coefficient surfaces or with abrupt brake application.

4. In an anti-lock brake control system for a wheeled vehicle having wheel braking means, a brake regulator means including means for sensing rotation of a braked wheel and a control circuit responsive to wheel rotation for cyclically effecting brake release and brake application to prevent wheel lock-up, the control circuit having means for producing a signal as a function of wheel deceleration, means for producing a signal as a time delayed function of wheel deceleration, a first capacitor responsive to the time delayed signal for storing a reference signal tending to follow the time delayed signal comparator means for comparing the deceleration signal to the reference signal so that the sensitivity of the comparator means to wheel deceleration is affected by the value of the reference signal, rate means responsive to rotation of a braked wheel for measuring the rate of change of wheel deceleration, a second capacitor and a variable impedance in series therewith connected across the first capacitor, and means responsive to the rate of change of deceleration for varying the variable impedance to thereby alter the value of the stored reference signal and change the sensitivity of the control whereby on low coefficient surfaces and with relatively gradual brake application, the control is more sensitive to wheel deceleration than on high coefficient surfaces or with abrupt brake application.

* * * * *